United States Patent [19]

van der Lely

[11] 4,298,070
[45] Nov. 3, 1981

[54] SOIL CULTIVATING MACHINES

[76] Inventor: Cornelis van der Lely, 7, Brüschenrain, Zug, Switzerland

[21] Appl. No.: 66,639

[22] Filed: Aug. 14, 1979

[30] Foreign Application Priority Data

Aug. 18, 1978 [NL] Netherlands ................. 7808557
Aug. 18, 1978 [NL] Netherlands ................. 7808558

[51] Int. Cl.³ ................. A01B 33/02; A01B 33/14
[52] U.S. Cl. ................. 172/123; 172/119; 172/532; 172/604
[58] Field of Search ........... 172/123, 119, 120, 122, 172/124, 540, 543, 68, 547, 548, 549, 550, 551, 554, 555, 604, 532

[56] References Cited

U.S. PATENT DOCUMENTS

| 1,300,442 | 4/1919 | Matoushek | 172/540 |
| 2,754,744 | 7/1956 | Hall | 172/548 X |
| 4,151,883 | 5/1979 | van der Lely et al. | 172/123 X |

FOREIGN PATENT DOCUMENTS 684202 12/1952 United Kingdom ............. 172/549
821349 10/1959 United Kingdom .

OTHER PUBLICATIONS

Howard Rotavator Co. Inc., Advertising Circular for Howarr Spikerotor 9-1972.

Primary Examiner—Paul E. Shapiro

[57] ABSTRACT

A soil cultivating machine has a frame and a rotor journalled in the frame, the rotor being an elongated rotatable carrier with a plurality of cultivating members mounted along the length of the rotor. To simplify manufacture, the rotor carrier has a plurality of projecting mountings that extend substantially parallel to the axis of rotation. Plate or sheet cultivating members are fastened to the mountings to extend substantially at right angles to the carrier. To ensure penetration into the soil, each cultivating member has a curved outer circumference and is of knife-formation. A portion of the member extends substantially parallel to the normal direction of rotation of the rotor and a further portion is bent-over at an angle to this direction. Viewed from the side, successive cultivating members at least partially overlap one another.

19 Claims, 8 Drawing Figures

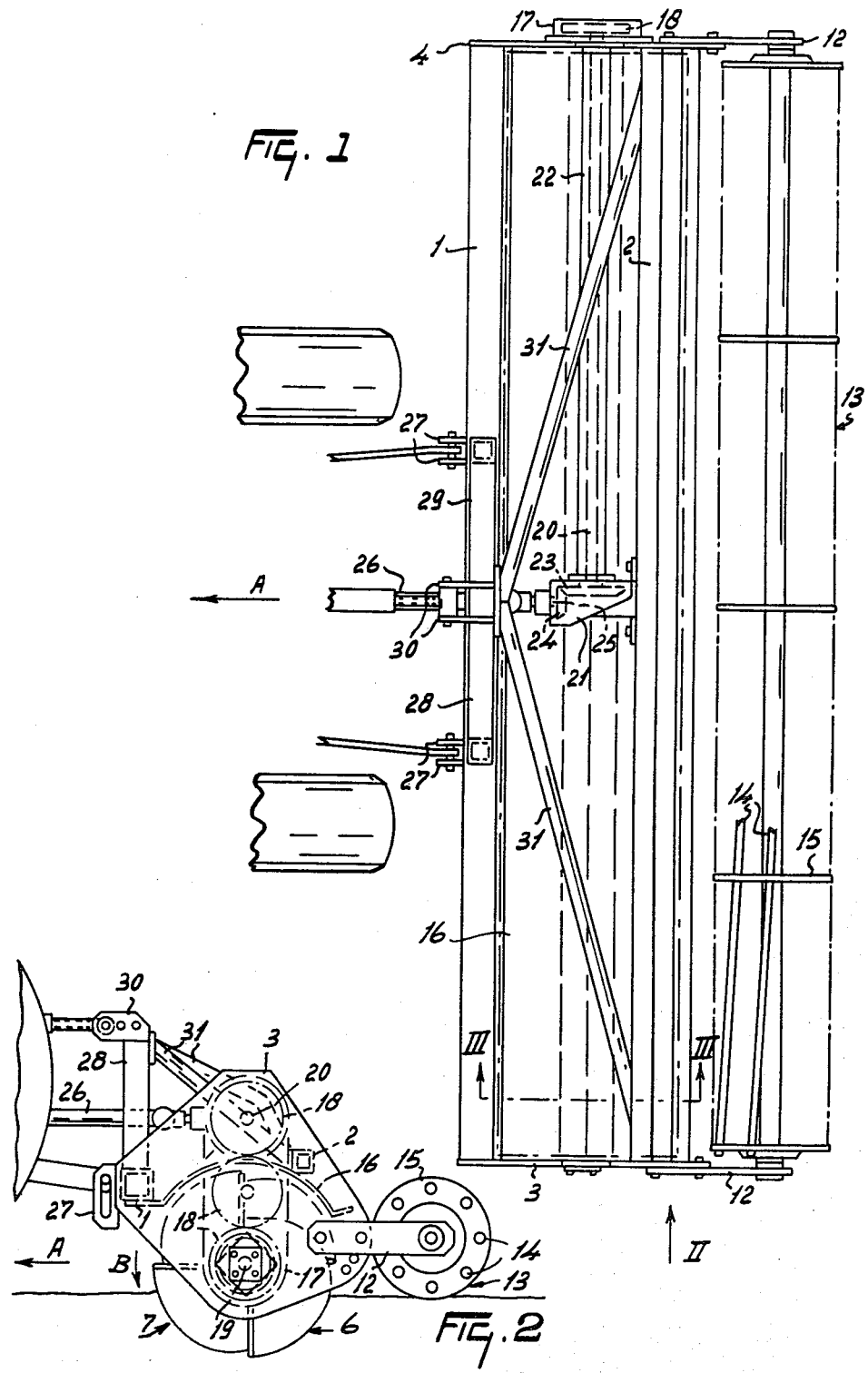

SOIL CULTIVATING MACHINES

In soil cultivating machines having a frame and at least one rotor journalled in this frame and comprising a rotatable carrier and a plurality of cultivating members arranged thereon, the fastening area of the cultivating members on the carrier particularly when the cultivating members have a comparatively large operative surface, is exposed during operation to such a load that a heavy structure is required, which usually results in a complicated and expensive structure of the rotor.

According to the present invention there is provided a soil cultivating machine comprising a frame and a rotor journalled in this frame and comprising an elongated rotatable carrier and a plurality of cultivating members arranged thereon, the cultivating members being formed of sheet material and the carrier comprising a plurality of mountings projecting from a body of the carrier and extending substantially parallel to the axis of rotation of the carrier, to which mountings the cultivating members are fastened so as to extend substantially at right angles to the carrier, each cultivating member having a curved outer circumference part. With such a construction of the connection of the cultivating members, which in view of their form can readily penetrate into the soil, is simplified to an extent such that a rotor can be built up in a simple manner, while reliability of operation is maintained, so that manufacturing costs are minimised.

For a better understanding of the invention and to show how the same may be carried into effect, reference will now be made, by way of example, to the accompanying drawings, in which:

FIG. 1 is a plan view of a soil cultivating machine,

FIG. 2 is a side view taken in the direction of arrow II in FIG. 1,

Figure 3:
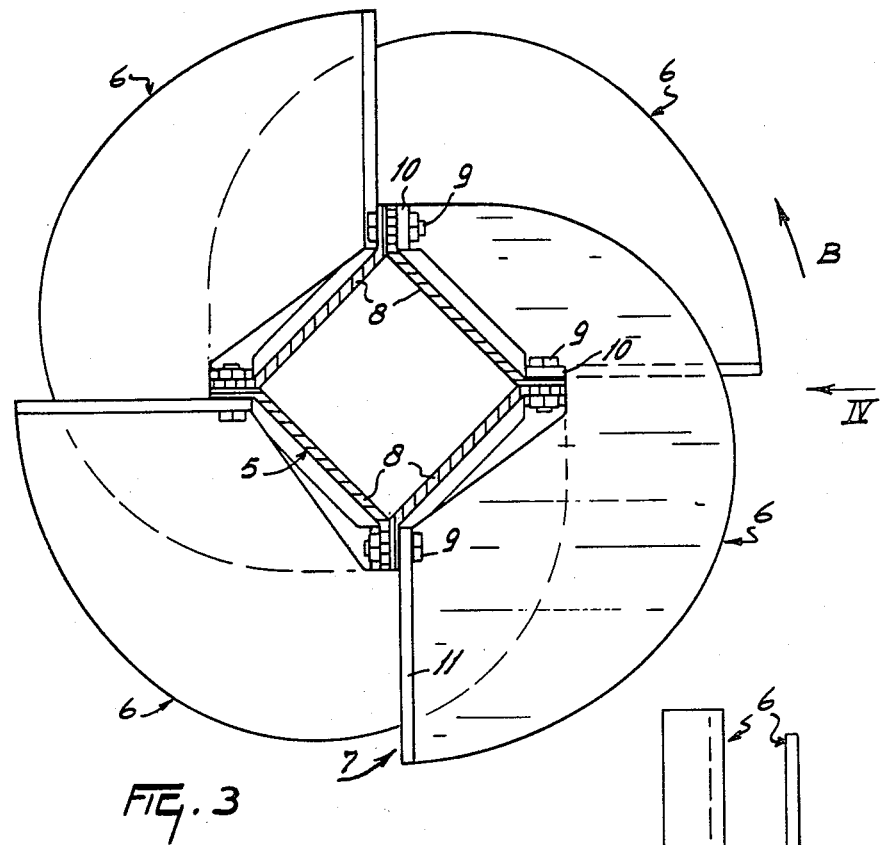
Figure 4:
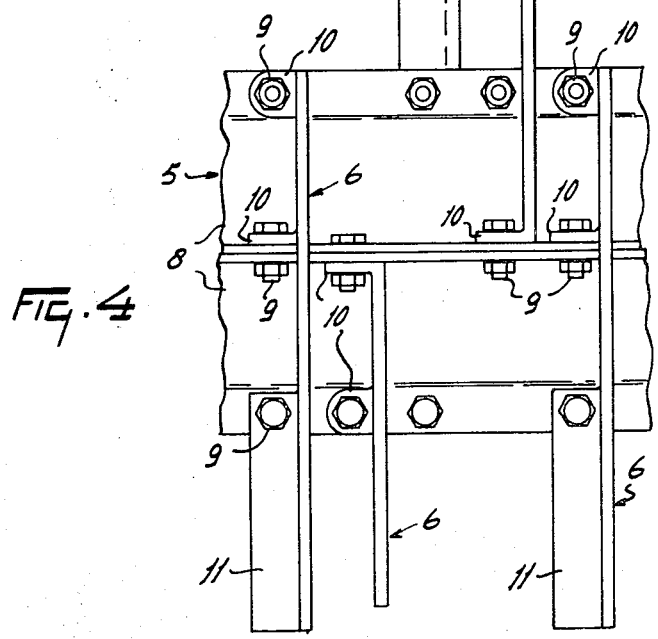
Figure 5:
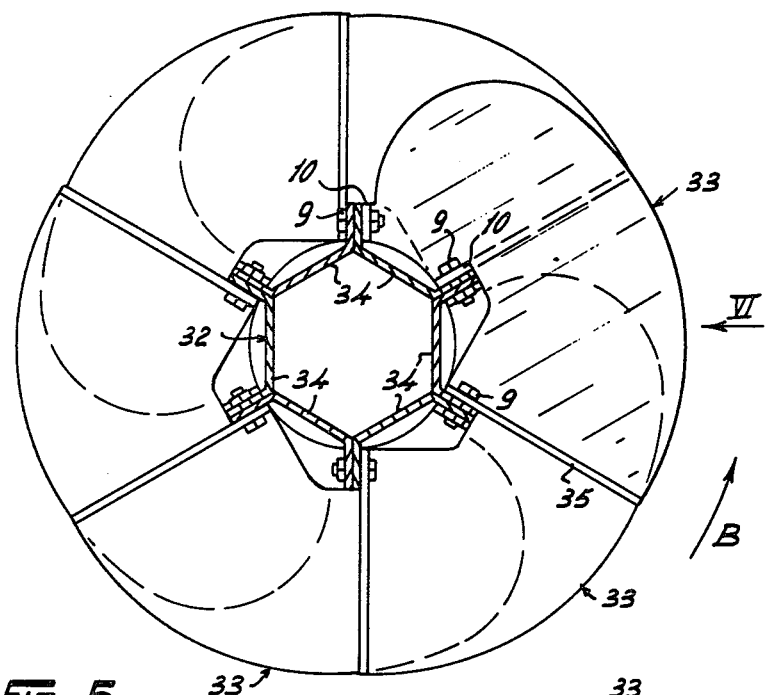
Figure 6:
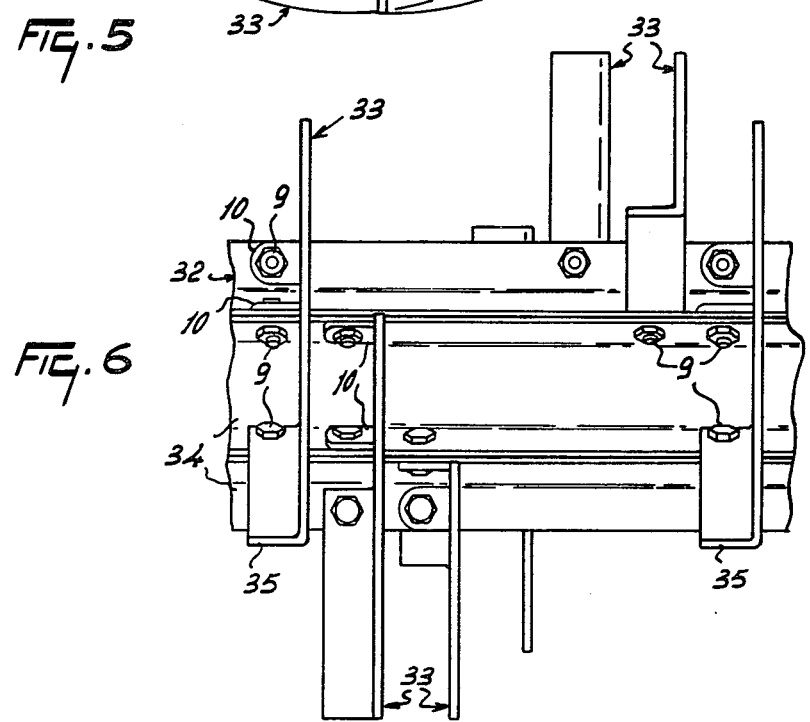
Figure 7:
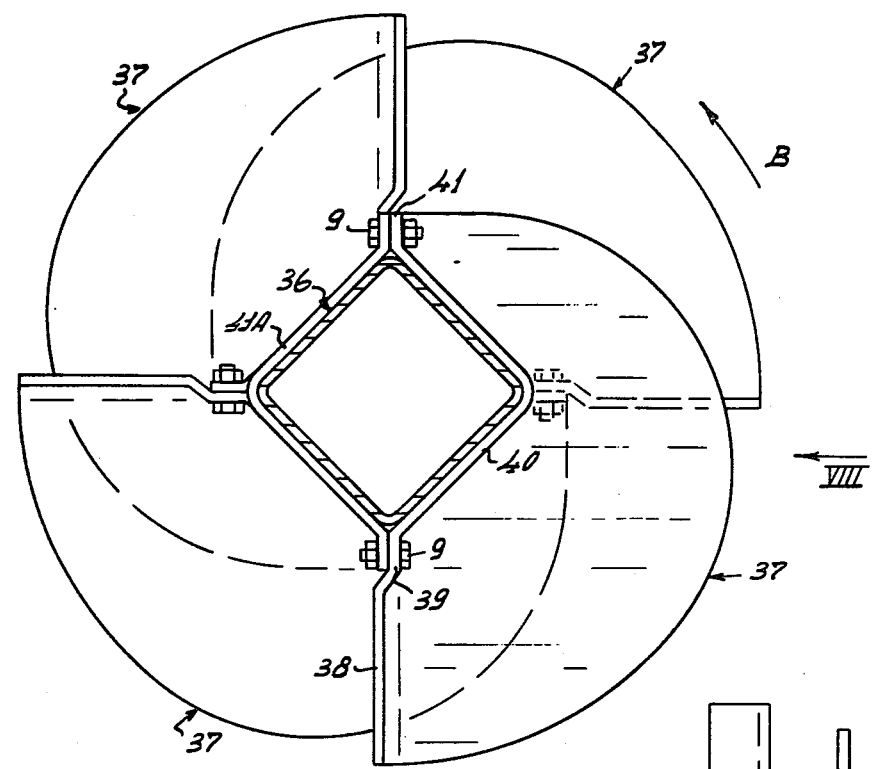
Figure 8:
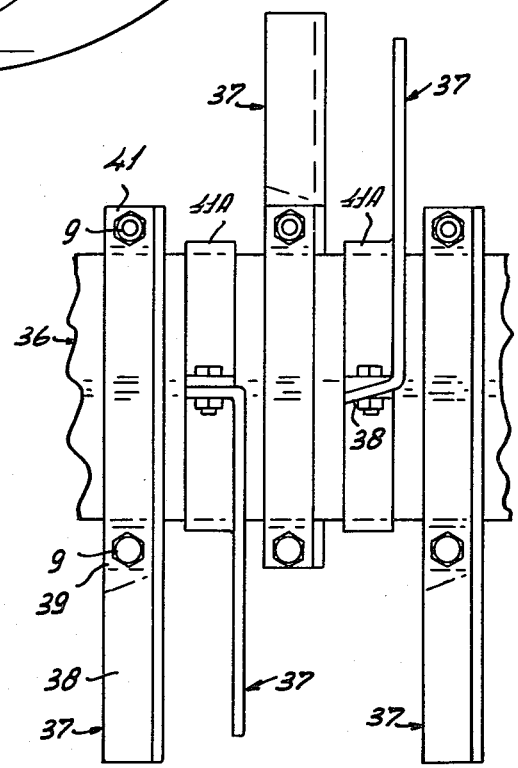

FIG. 3 is a sectional side view on a larger scale of a rotor, taken on the line III—III in FIG. 1, FIG. 4 is a rear view taken in the direction of arrow IV in FIG. 3 of part of the rotor, FIG. 5 is a sectional side view similar to FIG. 3 but showing a second constructional form, FIG. 6 is a rear view taken in the direction of arrow VI in FIG. 5 but otherwise similar to FIG. 4, FIG. 7 is a sectional side view similar to FIG. 3 but showing a third constructional form, and FIG. 8 is a rear view taken in the direction of arrow VIII in FIG. 7 but otherwise similar to FIG. 4.

Each of the soil cultivating machines illustrated in the Figures includes a frame having two frame beams 1 and 2 extending transversely of the intended direction of operative travel A of the machine and disposed one behind the other with respect to this direction. The ends of these beams are interconnected by means of upwardly extending plates 3 and 4. As will be seen from FIG. 2, each of the plates 3 and 4 has a substantially rhombic shape and is disposed so that the leading frame beam 1 is fastened at a corner.

Between the plates 3 and 4 there extends a carrier 5 (FIG. 3 and 4) to which cultivating members 6 are fastened. The carrier 5 with the cultivating members 6 constitutes a rotor 7 that is rotatably supported in the plates 3 and 4 with the aid of stub shafts and bearings. The carrier 5 is formed from four identical elongate plates 8, the longitudinal edges of which are bent over and clamped each to a corresponding edge of the next adjacent plate 8 with the aid of bolts 9. There is thus formed a hollow carrier having a main body of square cross-section with the clamped-together longitudinal edges of the plates constituting radial extensions extending from this main body along the length of the carrier and parallel to the longitudinal center line of the carrier. The cultivating members 6 are secured on the carrier 5 by means of the bolts 9 so as to be supported at the extensions formed by the longitudinal edges of the plates 8, these extensions thus forming mountings for the cultivating members.

From FIG. 3 it will be apparent that each cultivating member 6 is a knife formed from sheet material with its outer circumference part that is remote from the carrier 5 covering a circumferential angle of 180° and having over the major part of its length substantially the shape of an involute. With respect to the intended direction of operative rotation B of the rotor 7 the leading end of this outer circumference part is nearer the rotary axis of the carrier 5 than is the trailing end. At the trailing end this outer circumference part extends substantially tangentially with respect to a circle centered on the rotary axis. At the leading end, before changing over to the involute, the outer circumference part extends over a small distance away from the fastening to the carrier substantially tangentially with respect to a circle centered on the rotary axis. The distance from the main body of the carrier 5 to the outer circumference part at the leading end is about one sixth of the corresponding distance at the trailing end. On its inner circumference part facing the carrier 5 each member 6 has two fastening portions 10, one adjacent the leading end of the outer circumference part and the other spaced apart by a circumferential angle of about 90° from the first. These portions 10 are bent over at right angles from the remainder of the member 6 and are secured by the bolts 9 to two of the extensions formed by the longitudinal edges of the plates 8. At the trailing end the cultivating member 6 is secured to a third of these extensions at one end of a straight rim 11 bent over at right angles and extending in a radial direction from the inner circumference part to the outer circumference part transverse to the direction of operative rotation B of the rotor. Between its fastening points to the carrier each cultivating member 6 has a recess between it and the adjacent plates 8 which has a substantially constant width between the leading and the central fastening points but which has, between the central and trailing fastening points, a width that decreases in the direction towards the trailing fastening point.

Viewed in the direction along the carrier 5 successive cultivating members 6 are helically arranged one after the other, each displaced through an angle of 90° with respect to its neighbours, neighbouring members 6 overlapping one another over about one third of their total surface. In this way a satisfactory co-operation is obtained in operation between the sucessive cultivating members. The distance between sucessive cultivating members 6 is substantially equal to the width of each bent-over rim 11. The three fastening points for each member 6 spaced apart by circumferential angles of about 90° and not lying on one straight line for consecutive members 6 as viewed in the direction along the carrier 5 provide a reliable connection of the cultivating members 6, which is eminently suitable for effectively absorbing the heavy lateral forces exerted during operation on the cultivating members due to their being in the form of knifes formed from sheet material. The sheet from which each cultivating member 6 is formed preferably has a thickness of 6 mms and the diameter of the rotor 7 formed by the carrier 5 and the cultivating members 6 arranged thereon amounts to about 50 cms.

At the rear of the plates 3 and 4 rearwardly extending arms 12 are pivotally secured and are fixable in any selected one of a plurality of positions. Between the rear ends of the arms 12 a roller 13 is freely rotatable, this roller comprising a plurality of helically extending elongated elements 14 located at the circumference of the roller and extending in the direction of length of the roller, these elements being supported near the circumferences of sheet material supports 15.

The rotor 7 is covered at the top by a screening hood 16 which is supported between the plates 3 and 4.

The rotor 7 is driven from the plate 4 and by a pinion transmission that is in a casing 17 on the plate 4. The pinion transmission consists of three identical pinions 18 disposed one above another and and one of which is on a stub shaft 19 of the carrier 5. The pinion 18 on the stub shaft 19 is drivably in mesh through an intermediate pinion 18 with a pinion 18 on a shaft 20 which extends parallel to the carrier 5 and is journalled at its other end in a gear box 21. The shaft 20 is contained in a tube 22 located between the plate 4 and the gear box 21. Inside the gear box 21 the shaft 20 is provided with a bevel pinion 23 co-operating with a bevel pinion 24 on a shaft 25 which projects from the front of the gear box and can be coupled through an auxiliary shaft 26 with the power take-off shaft of a tractor.

At the front the frame beam 1 is provided at equal distances from the center with pairs of lugs 27 for coupling the lower arms of the lifting device of a tractor. At the level of the pairs of lugs 27 the frame beam is provided with upwardly extending supports 28 which are interconnected at the top by means of a tie beam 29. Near the center this beam 29 is provided with plates 30 between which the top arm of the lifting device of the tractor can be coupled. The rear of the beam 29 is connected by means of downwardly inclined, diverging struts 31 with the ends of the trailing frame beam 2.

The machine described above operates as follows.

During operation the machine is coupled with the aid of the pairs of lugs 27 and the plates 30 with respective arms of the three-point lift of a tractor and the shaft 25 is linked through the auxiliary shaft 26 to the power take-off shaft of the tractor. From the power take-off shaft of the tractor, via the transmission described above, the rotor 7 is driven so that it rotates in the direction B indicated in FIGS. 2 and 3. Before starting work the working depth of the rotor 7 can be set with the aid of the roller 13. During each operative run of the machine in the direction of the arrow A the cultivating members 6 of the rotor 7 rotating at a set speed work an uninterrupted strip of soil. During the rotation of the carrier 5 in the indicated direction B, first the substantially tangential leading end portions of the outer circumference part of each cultivating member 6 penetrates into the soil, after which follows the remainder of the outer circumference of the cultivating member extending substantially as an involute. The specific shape of the outer circumference part of the cultivating member ensures a gradual penetration into the soil, while vegetal residues, for example, straw, are effectively buried. The trailing rim 11 bent over at right angles can provide a satisfactory pulverisation of the earth cut up by the preceding part of the cultivating member.

The extensions formed by the longitudinal edges of the plates 8 of the carrier 5 and constituting mountings for the cultivating means provide an effective mode of fastening the cultivating members which are in the form of knives formed from sheet material and which extend substantially transversely of the carrier and parallel to the direction of rotation of the rotor. The respective cultivating members 6 can be simply made from sheet material by punching, and their fastening mode is such that they can be readily mounted together with the carrier and, if necessary, be readily replaced. The assembly is a cheap but nevertheless reliable construction for a rotor provided with cultivating members in the form of knives for use in a soil cultivating machine.

In the form shown in FIGS. 5 and 6 a carrier 32 with cultivating members 33 in the form of knives is built up from six plates 34 interconnected by means of bent-over longitudinal edges held clamped together by bolts 9, so that the main body of the carrier has a cross-section in the form of a regular hexagon. The respective extensions formed by the interconnected longitudinal edges extend also in this case in a substantially radial direction with respect to the longitudinal center line of the carrier 32. The cultivating members 33 are again made from sheet material and the outer circumference part remote from the carrier extends substantially along an involute but in this form at the leading end the involute is more strongly curved and joins the carrier through a substantially radial part.

The mode of fastening the cultivating members 32 corresponds with that of the cultivating members 6 of FIGS. 1 to 4. However, in this form each cultivating member covers a circumferential angle of about 120° and its respective fastening points are spaced apart by circumferential angles of 60°. The rearmost fastening area also forms part of a rim 35 bent over at right angles and extending radially as in the form first described. As before, neighbouring cultivating members 33 are arranged in helical fashion, viewed along the carrier 32 and successive cultivating members are relatively offset through circumferential angles of 60° with respect to the longitudinal center line of the carrier. In this case neighbouring cultivating members overlap one another by about one third. The diameter of the rotor formed by the carrier 32 with the cultivating members 33 arranged thereon is again about 50 centimeters and the distance between two consecutive cultivating members substantially corresponds to the width of each bent-over rim 35. The operation of the cultivating members substantially corresponds with that of the cultivating members 6 already described. However, the cutting effect is shifted further to the leading ends so that, as will be seen from FIG. 5, the larger width part of each cultivating member is located in front of the trailing part of the cultivating member.

In the form shown in FIGS. 7 and 8 the carrier 36 has the shape of an elongated box made from one piece of sheet material and has an angular, in the form shown square, cross-section. Each of the cultivating members 37 (made from sheet material as before) has for its outer circumference part the shape illustrated in FIG. 7, which substantially corresponds with that of the cultivating members 6 first described. In this form, however, each cultivating member has in its inner circumference part a recess facing the carrier 36 covering a circumferential angle of about 180° and corresponding to the angular shape of the carrier 36. The location of the recess is such that the leading end of the outer circumference part of the cultivating member 37 is also in this case at a distance from the carrier which is about one sixth of the distance between the trailing end of the outer circumference part and the carrier. At the trailing end of the cultivating member 3 there is a bent-over rim an outer part 38 of which extends substantially in a radial direction. In this case this rim part 38 is bent over through an angle of about 60° viewed from the outer circumference part and is followed by a rim part 39 bent over at 90°. The rim part 38 extends over three quarters of the overall length of the two parts 38 and 39. The part 39 is followed by a rim part 40 bounding the recess facing the carrier 36 and this is followed by a rim part 41 substantially in line with the rim part 38 and extending up to the leading end of the outer circumference part of the cultivating member. To the rims parts 39 and 41 are clamped the ends of a bracket 41A for fastening the cultivating member so that the rim part 40 of the cultivating member is opposed by the bracket, and the rim part 40 and this bracket 41A establish, between them, the clamping connection with the carrier. Consecutive cultivating members 37 fastened in this manner are displaced from one another through circumferential angles of about 90° with respect to the longitudinal center line of the carrier in a manner such that, viewed along the carrier, the successive cultivating members 37 are disposed in helical fashion at a distance from one another which slightly exceeds that between successive cultivating members in the forms so far described. As before the respective cultivating members 37 can be punched from sheet material and the fastening mode is such that they can be readily mounted and replaced, if necessary. The operation of these cultivating members corresponds with that of the cultivating members of the first form.

While various features of the machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil cultivating machine including a frame and a rotor journalled in said frame, said rotor comprising an elongated carrier that is rotatable about a substantially horizontally axis and a plurality of cultivating members mounted along the length of said carrier, each member being flat and extending outwardly from the axis of rotor rotation, the outer circumference of said member being curved and defining part of the perimeter of said rotor, a leading end of said circumference being located nearer said axis than a trailing end of said member, said trailing end comprising a rim that is bent-over through an angle of about 90°.

2. A soil cultivating machine as claimed in claim 1, wherein each cultivating member is made from sheet material.

3. A soil cultivating machine as claimed in claim 2, wherein each member extends through a circumferential angle of about 180° around said carrier.

4. A soil cultivating machine as claimed in claim 1, wherein the leading end of said outer circumference is spaced from said carrier by a distance about one sixth the distance between said trailing end and the carrier.

5. A soil cultivating machine including a frame and a rotor journalled in said frame, said rotor comprising an elongated carrier that is rotatable about a substantially horizontally axis and a plurality of cultivating members mounted along the length of said carrier, each member being flat and extending outwardly from the axis of rotor rotation, the outer circumference of said member being curved and defining part of the perimeter of said rotor, a leading end of said circumference being located nearer said axis that a trailing end of said member, said trailing end comprising a bent-over rim that extends from the outer circumference substantially in a radial direction.

6. A soil cultivating machine as claimed in claim 5, wherein said leading end initially extends in a direction tangential to a circle centered on said axis of the carrier.

7. A soil cultivating machine as claimed in claim 5, wherein an inner circumference of each member has spaced apart fasteners that secure said member to the carrier, said carrier being plural sided and said fasteners being located on different sides of the carrier.

8. A soil cultivating machine as claimed in claim 7, wherein said fasteners are spaced apart by circumferential angles of about 90°.

9. A soil cultivating machine as claimed in claim 7, wherein said fasteners are spaced apart by a distance covering a circumferential angle of about 60°.

10. A soil cultivating machine as claimed in claim 7, wherein, with respect to the normal direction of rotation of the rotor, leading and intermediate fasteners comprise lugs and a trailing fastener comprises a rim of said member.

11. A soil cultivating machine including a frame and a rotor journalled in said frame, said rotor comprising an elongated carrier that is rotatable about a substantially horizontally axis and a plurality of cultivating member mounted along the length of said carrier, each member being flat and extending outwardly from the axis of rotor rotation, the outer circumference of said member being curved and defining part of the perimeter of said rotor, a leading end of said circumference being located nearer said axis than a trailing end of said member, said trailing end comprising a bent over rim that extends from said circumference to said carrier.

12. A soil cultivating machine as claimed in claim 11, wherein said outer circumference initially extends in a direction radial from the axis of rotation of said carrier.

13. A soil cultivating machine including a frame and a rotor journalled in said frame, said rotor comprising an elongated carrier that is rotatable about a substantially horizontal axis and a plurality of cultivating members mounted along the length of said carrier, each member being flat and extending outwardly from the axis of rotor rotation, the outer circumference of said member being curved and defining part of the perimeter of said rotor, the inner circumference of said member co-extending with the surface of said carrier and fastening means securing said inner circumference to said carrier, fastening mountings on the surface of said carrier being formed by bent-over longitudinal edges of plates and said carrier comprising assembled plates, said fastening means comprising rims on the inner circumference secured by means which clamps respective longitudinal axes of the plates to one another.

14. A soil cultivating machine as claimed in claim 13, wherein said carrier is multi-sided and assembled from four identical elongated plates, said carrier having a substantially square cross-section.

15. A soil cultivating machine as claimed in claim 13, wherein said carrier comprises a hollow assembly of six identical elongated plates and has a substantially regular hexagon cross-section.

16. A soil cultivating machine as claimed in claim 13, wherein the carrier is hollow and angular in cross-section, each cultivating member being clamped to said carrier with a rim of said inner circumference and a bracket that clasps said carrier.

17. A soil cultivating machine as claimed in claim 16, wherein said rim is bent-over for its entire length, a portion of said rim lying between edges bounding a recess which corresponds to the shape of said carrier.

18. A soil cultivating machine as claimed in claim 17, wherein from the outer circumference, said rim is bent-over through an angle of about 60°.

19. A soil cultivating machine as claimed in claim 18, wherein a further part of said inner rim is bent-over through an angle of about 90°.

* * * * *